US008819664B2

(12) United States Patent
Holmberg et al.

(10) Patent No.: US 8,819,664 B2
(45) Date of Patent: Aug. 26, 2014

(54) UPGRADE FIRMWARE WITH UPGRADE INFORMATION FROM A TAPE CARTRIDGE IN A WIRELESS MANNER

(71) Applicant: Hewlett-Packard Development Company, L. P., Houston, TX (US)

(72) Inventors: Mike Alan Holmberg, Eagle, ID (US); John D Hampton, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 13/666,607

(22) Filed: Nov. 1, 2012

(65) Prior Publication Data

US 2014/0123120 A1 May 1, 2014

(51) Int. Cl.
*G06F 9/44* (2006.01)

(52) U.S. Cl.
USPC ......................................................... 717/168

(58) Field of Classification Search
None
See application file for complete search history.

(56) References Cited

U.S. PATENT DOCUMENTS

| 6,201,474 | B1 * | 3/2001 | Brady et al. ............... 340/572.8 |
| 7,124,943 | B2 * | 10/2006 | Quan et al. ..................... 235/451 |
| 7,624,392 | B2 * | 11/2009 | Bando ........................... 717/169 |
| 7,739,396 | B2 | 6/2010 | Adams et al. |
| 8,113,727 | B2 | 2/2012 | Niwa et al. |
| 8,225,135 | B2 * | 7/2012 | Barrall et al. .................. 714/6.1 |
| 8,245,219 | B2 * | 8/2012 | Agarwal et al. ............... 717/172 |
| 8,589,302 | B2 * | 11/2013 | Prakash et al. ................. 705/50 |
| 2002/0140966 | A1 * | 10/2002 | Meade et al. ................. 358/1.15 |
| 2002/0188934 | A1 * | 12/2002 | Griffioen et al. .............. 717/170 |
| 2005/0097542 | A1 * | 5/2005 | Lee ............................... 717/168 |
| 2008/0005733 | A1 * | 1/2008 | Ramachandran et al. ..... 717/168 |
| 2008/0184151 | A1 | 7/2008 | Agarwal et al. |
| 2012/0144380 | A1 * | 6/2012 | Rabeler et al. ................ 717/170 |

* cited by examiner

*Primary Examiner* — Lewis A Bullock, Jr.
*Assistant Examiner* — Jacob Dascomb
(74) *Attorney, Agent, or Firm* — Victor DeVito

(57) ABSTRACT

A method may include receiving a respective tape cartridge of a plurality of tape cartridges by a respective cartridge receiving compartment of a plurality of cartridge receiving compartments and configuring a memory of a tape drive manager to include a plurality of information modules associated with the plurality of tape cartridges, respectively. Each information module may include an internal tape identifier to identify a corresponding tape cartridge and a firmware to cause the tape drive manager to write data to and read data from the corresponding tape cartridge. The method may also include upgrading the respective firmware of a respective information module associated with the respective tape cartridge by the tape drive manager using upgrade information obtained from the respective tape cartridge in the wireless manner based on an affirmative identifier determination.

14 Claims, 4 Drawing Sheets

UPGRADE FIRMWARE WITH UPGRADE INFORMATION FROM A TAPE CARTRIDGE IN A WIRELESS MANNER

BACKGROUND

A tape library may include a plurality of tape drives which receive tape cartridges. The tape library may physically transfer the tape cartridges to the tape drives to read data from and write data to the tape media such as magnetic media of the tape cartridges.

BRIEF DESCRIPTION OF THE DRAWINGS

Non-limiting examples are described in the following description, read with reference to the figures attached hereto and do not limit the scope of the claims. Dimensions of components and features illustrated in the figures are chosen primarily for convenience and clarity of presentation and are not necessarily to scale. Referring to the attached figures:

DETAILED DESCRIPTION

A tape library may include a plurality of tape drives which receive tape cartridges. The tape library may physically transfer the tape cartridges to the tape drives to read data from and write data to the tape media such as magnetic media of the tape cartridges. Data may be read from and written to tape media of the tape drive using firmware of the tape drive. A tape cartridge manufacturer, however, may produce a new version of a tape cartridge including tape media having characteristics that may prevent the current firmware of the tape drive from reading data from and writing data to the new version of the tape cartridge. That is, the current firmware of the tape drive may be incompatible with the new version of the tape cartridge. Further, additional functionality may want to be provided to the tape library and/or tape drive. Accordingly, for the new version of the tape cartridge to work with the tape drive, the current firmware may have to be manually upgraded. Such manual upgrading may require time from a user and reduce throughput of the tape library.

In examples, a method of upgrading firmware with upgrade information from a tape cartridge may include, amongst other things, receiving a respective tape cartridge of a plurality of tape cartridges by a respective cartridge receiving compartment of a plurality of cartridge receiving compartments. The method may also include determining whether an external tape identifier obtained from the respective tape cartridge in a wireless manner corresponds with an internal tape identifier of one of the plurality of information modules by the tape drive manager. The affirmative identifier determination may be made in response to the respective cartridge receiving compartment receiving the respective tape cartridge. That is, in response to the respective cartridge receiving compartment receiving the respective tape cartridge, the tape drive manager may engage in determining whether the respective external and internal identifiers correspond with each other and, if so, an affirmative identifier determination is made. The method may also include upgrading the respective firmware of a respective information module associated with the respective tape cartridge by the tape drive manager. For example, the tape drive manager may use upgrade information obtained from the respective tape cartridge in the wireless manner based on the affirmative identifier determination. Accordingly, a tape cartridge may be received in a cartridge receiving compartment of a tape library to automatically and wirelessly upgrade current firmware thereof to enable the tape cartridge to be read from and written to. Thus, by automatically upgrading the tape drive upon an insertion of a respective tape cartridge therein, a previously incompatible tape cartridge may achieve compatibility with the tape drive and/or a compatible tape cartridge may provide additional functionality to the tape library and/or tape drive.

Figure 1:
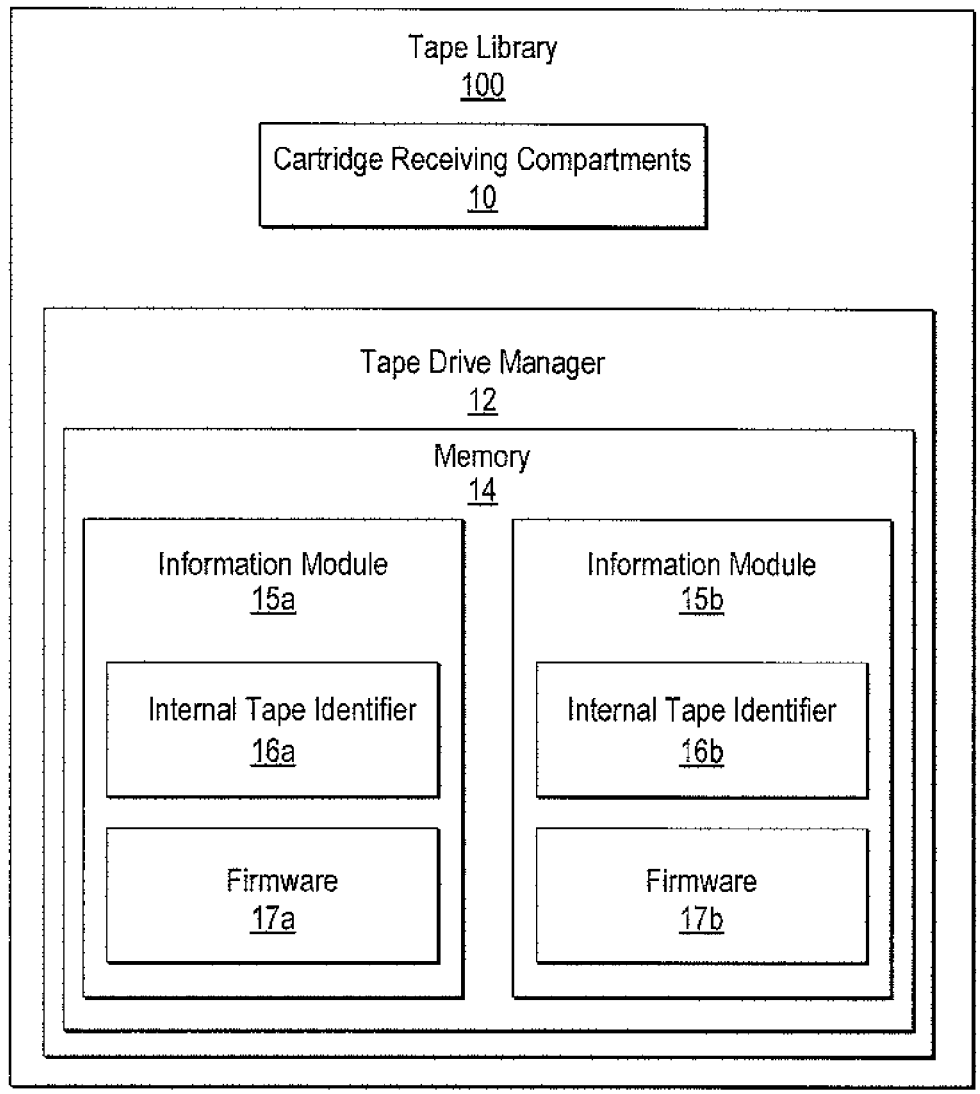
FIG. 1 is a block diagram illustrating a tape library according to an example.

FIG. 1 is a block diagram illustrating a tape library according to an example. Referring to FIG. 1, in some examples, a tape library 100 may include a plurality of cartridge receiving compartments 10 and a tape drive manager 12. The plurality of cartridge receiving compartments 10 may receive a plurality of tape cartridges, respectively. The tape drive manager 12 may include a memory 14 to include a plurality of information modules 15a and 15b associated with the plurality of tape cartridges, respectively. Each information module 15a and 15b may include an internal tape identifier 16a and 16b to identify a corresponding tape cartridge and a firmware 17a and 17b to cause the tape drive manager 12 to write data to and read data from the corresponding tape cartridge.

Referring to FIG. 1, in some examples, the tape drive manager 12 may also determine whether an external tape identifier obtained from the respective tape cartridge in a wireless manner corresponds with an internal tape identifier 16a and 16b of one of the plurality of information modules 15a and 15b in response to a respective tape cartridge receiving compartment 10 receiving a respective tape cartridge. That is, in response to the respective cartridge receiving compartment 10 receiving the respective tape cartridge, the tape drive manager 12 may engage in determining whether the respective internal tape identifier 16a and 16b and the external tape identifier correspond with each other and, if so, an affirmative identifier determination is made.

For example, the respective internal tape identifier 16a and 16b and the external tape identifier may correspond with each other if they are the same. Additionally, the respective internal tape identifier 16a and 16b and the external tape identifier may correspond with each other if at least one of them is within a target group such as within an identifier range. In some examples, the internal tape identifier 260n and 260nn may be alphanumeric characters, barcodes, and the like. The tape drive manager 12 may also upgrade the respective firmware 17a and 17b of a respective information module 15a and 15b associated with the respective tape cartridge using upgrade information obtained from the respective tape cartridge in the wireless manner based on an affirmative identifier determination. Further, the tape drive manager 12 may also subsequently execute the upgraded firmware to write data to and read data from the respective tape cartridge. Thus, by automatically upgrading a respective tape drive upon its insertion therein, a previously incompatible tape cartridge may achieve compatibility with the tape drive and/or a compatible tape cartridge may provide additional functionality to the tape library 100 and/or tape drive.

Figure 2:
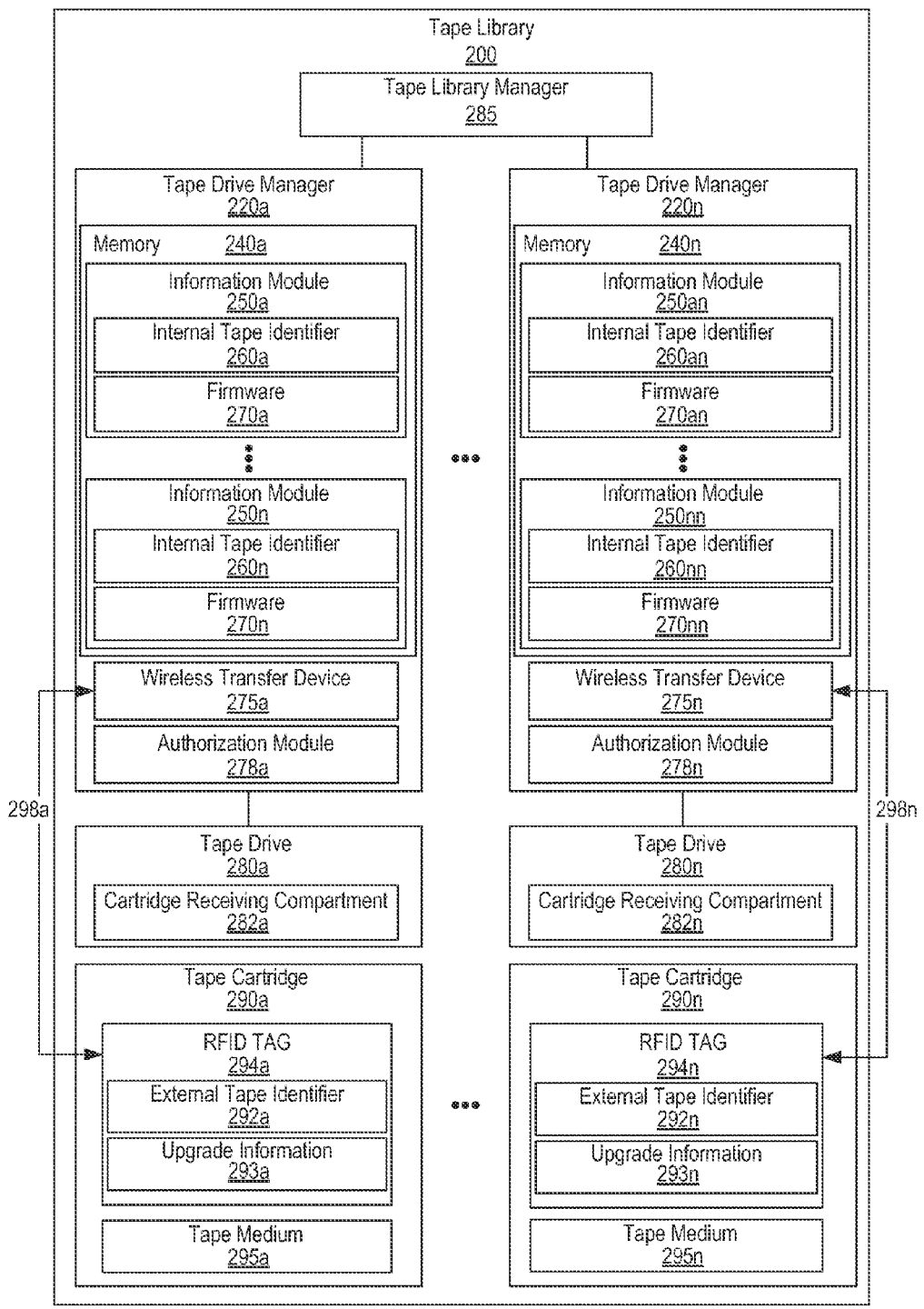
FIG. 2 is a schematic view illustrating the tape library of FIG. 1 according to an example.

FIG. 2 is a schematic view illustrating the tape library of FIG. 1 according to an example. Referring to FIG. 2, the tape library 200 may include a plurality of cartridge receiving compartments and a tape drive manager as previously disclosed with respect to FIG. 1. In some examples, the tape library 200 may also include a plurality of tape drives 280a and 280n, a tape library manager 285, a plurality of tape cartridges 290a and 290n, a wireless transfer device 275a and 275n, and a plurality of tape drive managers 220 and 220n. For example, each one of the plurality of tape drives 280a and 280n may include a respective cartridge receiving compartment 282a and 282n. In some examples, the respective cartridge receiving compartment 282a and 282n may include a slot to receive the respective tape cartridge 290a and 290n and a sensor to detect receiving the respective tape cartridge 290a and 290n therein. For example, the sensor may be a mechanical and/or electrical sensor to detect the physical presence of the respective tape cartridge 290a and 290n. The tape library manager 285 may transfer the respective tape cartridge 290a and 290n to the respective cartridge receiving compartment 282a and 282n of a respective tape drive 280a and 280n to allow the tape drive manager 220a and 220n to write data to and read data from the respective tape cartridge 290a and 290n.

Referring to FIG. 2, in some examples, the respective tape cartridge 290a and 290n may include tape media 295a and 295n, an external tape identifier 292a and 292n, and upgrade information 293a and 293n. The tape media 295a and 295n, for example, make be a magnetic media to store information such as data to be read from and written to by a tape drive 280a and 280n. The external tape identifier 292a and 292n may identify the corresponding tape cartridge 290a and 290n such as the type, manufacturer, characteristics, and the like. In some examples, the external tape identifier 292a and 292n may be alphanumeric characters, barcodes, and the like. The upgrade information 293a and 293n may include firmware, upgrade instructions, executable files, and/or code, and the like. In some examples, a radio frequency identification (RFID) tag 294a and 294n may be disposed on the respective tape cartridge 290a and 290n. The RFID tag 294a and 294n may include the external tape identifier 292a and 292n and the upgrade information 293a and 293n. The RFID tag 294a and 294n may broadcast the external tape identifier 292a and 292n and/or the upgrade information 293a and 293n.

Referring to FIG. 2, in some examples, the tape drive manager 220a and 220n and/or tape library 200 may include a wireless transfer device 275a and 275n to read from the RFID tag 294a and 294n disposed on the respective tape cartridge 290a and 290n. For example, a wireless communication path 298a and 298n may be established between the respective wireless transfer device 275a and 275n and RFID tag 294a and 294n. Thus, the wireless transfer device 275a and 275n may be used to establish the wireless communication path 298a and 298n to obtain the external tape identifier 292a and 292n from the respective tape cartridge 290a and 290n in a wireless manner. The tape drive manager 220a and 220n may determine whether the obtained external tape identifier 292a and 292n corresponds with an internal tape identifier 260a and 260an of one of the plurality of information modules 250a and 250an. That is, the wireless transfer device 275a and 275n may read the external tape identifier 292a and 292n broadcast by the RFID tag 294a and 294n disposed on the respective tape cartridge 290a and 290n.

Additionally, the wireless transfer device 275a and 275n may also be used for the tape drive manager 220a and 220n to upgrade the respective firmware 270n and 270nn of a respective information module 250n and 250nn associated with the respective tape cartridge 290a and 290n. The tape drive manager 220a and 220n may use upgrade information 293a and 293n obtained from the respective tape cartridge 290a and 290n in the wireless manner based on an affirmative identifier determination. That is, the wireless transfer device 275a and 275n may read and use the upgrade information 293a and 293n broadcast by the RFID tag 294a and 294n disposed on the respective tape cartridge 290a and 290n to upgrade the respective firmware 270n and 270nn.

Referring to FIG. 2, in some examples, the tape drive manager may upgrade the respective firmware of a respective information module associated with the respective tape cartridge as previously disclosed with respect to FIG. 1. In some examples, the respective firmware 270n and 270nn may be upgraded by the tape drive manager 220a and 220n identifying differences between the upgrade information 293a and 293n and the respective firmware 270n and 270nn. Additionally, the upgrade information 293a and 293n may be transferred to the respective information module 250n and 250nn associated with the respective firmware 270n and 270nn by the tape drive manager 220a and 220n for the upgraded firmware to include the identified differences. The upgrade information 293a and 293n may be used to upgrade the respective firmware 270n and 270nn of the information module 250n and 250nn corresponding to the respective tape cartridge 290a and 290n.

For example, the tape drive manager 220a and 220n may transfer the upgrade information 293a and 293n to the respective information module 250a and 250an associated with the respective firmware 270n and 270nn. In some examples, the tape drive manager 220a and 220n may replace the respective firmware 270n and 270nn with the upgrade information 293a and 293n. Alternatively, the tape drive manager 220a and 220n may add the identified differences between the upgrade information 293a and 293n and the respective firmware 270n and 270nn to the respective firmware 270n and 270nn by the tape drive manager 220a and 220n. Still yet, the tape drive manager 220a and 220n may execute the upgrade information 293a and 293n to change the respective firmware 270n and 270nn.

Referring to FIG. 2, in some examples, the tape drive manager 220a and 220n and/or tape library 200 may also include an authorization module 278a and 278n. For example, the authorization module 278a and 278n may verify whether the tape drive manager 220a and 220n is authorized to upgrade the respective firmware 270n and 270nn using the upgrade information 293a and 293n obtained from the respective tape cartridge 290a and 290n. Additionally, the authorization module 278a and 278n may also verify whether the tape drive manager 220a and 220n is authorized to write data to and read data from the respective tape cartridge 290a and 290n. For example, the authorization module 278a and 278n may include private/public keys, encryption, confirmation of access payment, and the like.

In some examples, a tape drive manager, information module, internal tape identifier, external tape identifier, and/or authorization module may be implemented in hardware, software including firmware, or combinations thereof. The firmware, for example, may be stored in memory and executed by a suitable instruction-execution system. If implemented in hardware, as in an alternative example, the tape drive manager, information module, internal tape identifier, external tape identifier, and/or authorization module may be implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies. In other examples, the tape drive manager, information module, internal tape identifier, external tape identifier, and/or authorization module may be implemented in a combination of software and data executed and stored under the control of a computing device.

Figure 3:
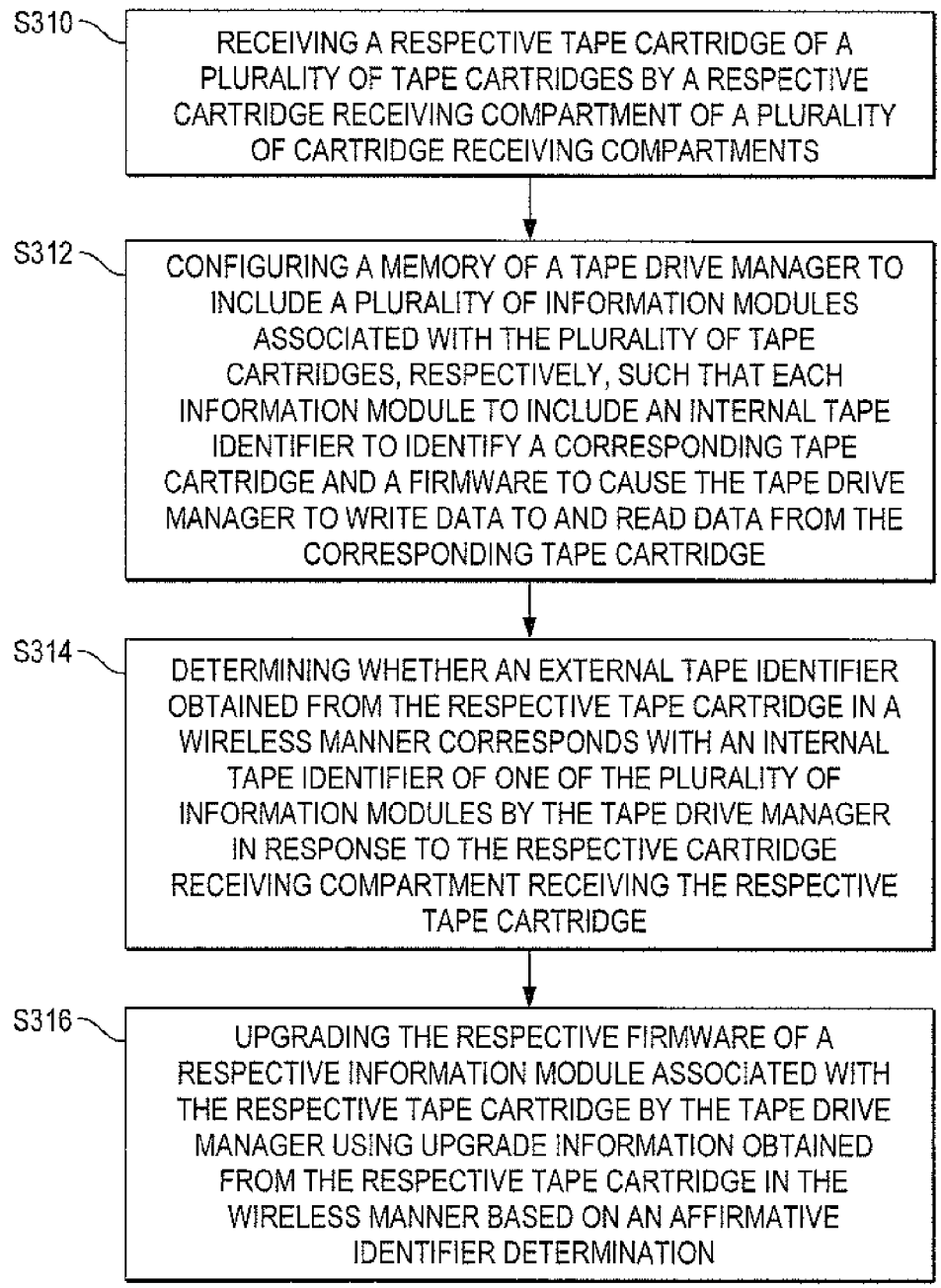
FIG. 3 is a flow chart illustrating a method of upgrading firmware with upgrade information from a tape cartridge according to an example.

FIG. 3 is a flow chart illustrating a method of upgrading firmware with upgrade information from a tape cartridge according to an example. In block S310, a respective tape cartridge of a plurality of tape cartridges is received by a respective cartridge receiving compartment of a plurality of cartridge receiving compartments. In block S312, a memory of a tape drive manager is configured to include a plurality of information modules associated with the plurality of tape cartridges, respectively, such that each information module to include an internal tape identifier to identify a corresponding tape cartridge and a firmware to cause the tape drive manager to write data to and read data from the corresponding tape cartridge.

In block S314, whether an external tape identifier obtained from the respective tape cartridge in a wireless manner corresponds with an internal tape identifier of one of the plurality of information modules is determined by the tape drive manager in response to the respective cartridge receiving compartment receiving the respective tape cartridge. For example, determining whether an external tape identifier obtained from the respective tape cartridge in a wireless manner corresponds with an internal tape identifier of one of the plurality of information modules by the tape drive manager may include reading from a RFID tag disposed on the respective tape cartridge by a wireless transfer device.

In some examples, the upgrade information being transferred to the respective information module associated with the respective firmware by the tape drive manager may include the respective firmware being replaced with the upgrade information by the tape drive manager. For example, the respective firmware may be replaced in its entirety. Alternatively, in some examples, the identified differences between the upgrade information and the respective firmware may be added to the respective firmware by the tape drive manager. Still yet, the tape drive manager may execute the upgrade information to change the respective firmware.

In block S316, the respective firmware of a respective information module associated with the respective tape cartridge is upgraded by the tape drive manager using upgrade information obtained from the respective tape cartridge in the wireless manner based on an affirmative identifier determination. For example, the upgrading the respective firmware of a respective information module associated with the respective tape cartridge by the tape drive manager using upgrade information obtained from the respective tape cartridge in the wireless manner based on an affirmative identifier determination may include reading from the RFID tag disposed on the respective tape cartridge by the wireless transfer device. In some examples, upgrading the respective firmware may include identifying differences between the upgrade information and the respective firmware by the tape drive manager. Additionally, the upgrade information may be transferred to the respective information module associated with the respective firmware by the tape drive manager for the upgraded firmware to include the identified differences.

In some examples, the method may also include the upgraded firmware subsequently being executed by the tape drive manager to write data to and read data from the respective tape cartridge. For example, reading from and writing to the tape cartridge and/or additional functionality may be performed. The method may also include the respective tape cartridge being transferred to the respective cartridge receiving compartment of a respective tape drive of a plurality of tape drives by a tape library manager to allow the tape drive manager to write data to and read data from the respective tape cartridge. The method may also include whether the tape drive manager is authorized to upgrade the respective firmware using the upgrade information obtained from the respective tape cartridge by an authorization module. The method may also include whether to write data to and read data from the respective tape cartridge is verified by the authorization module. For example, the authorization module may include private/public keys, encryption, confirmation of access payment, and the like. In some examples, the tape drive manager may include the authorization module.

Figure 4:
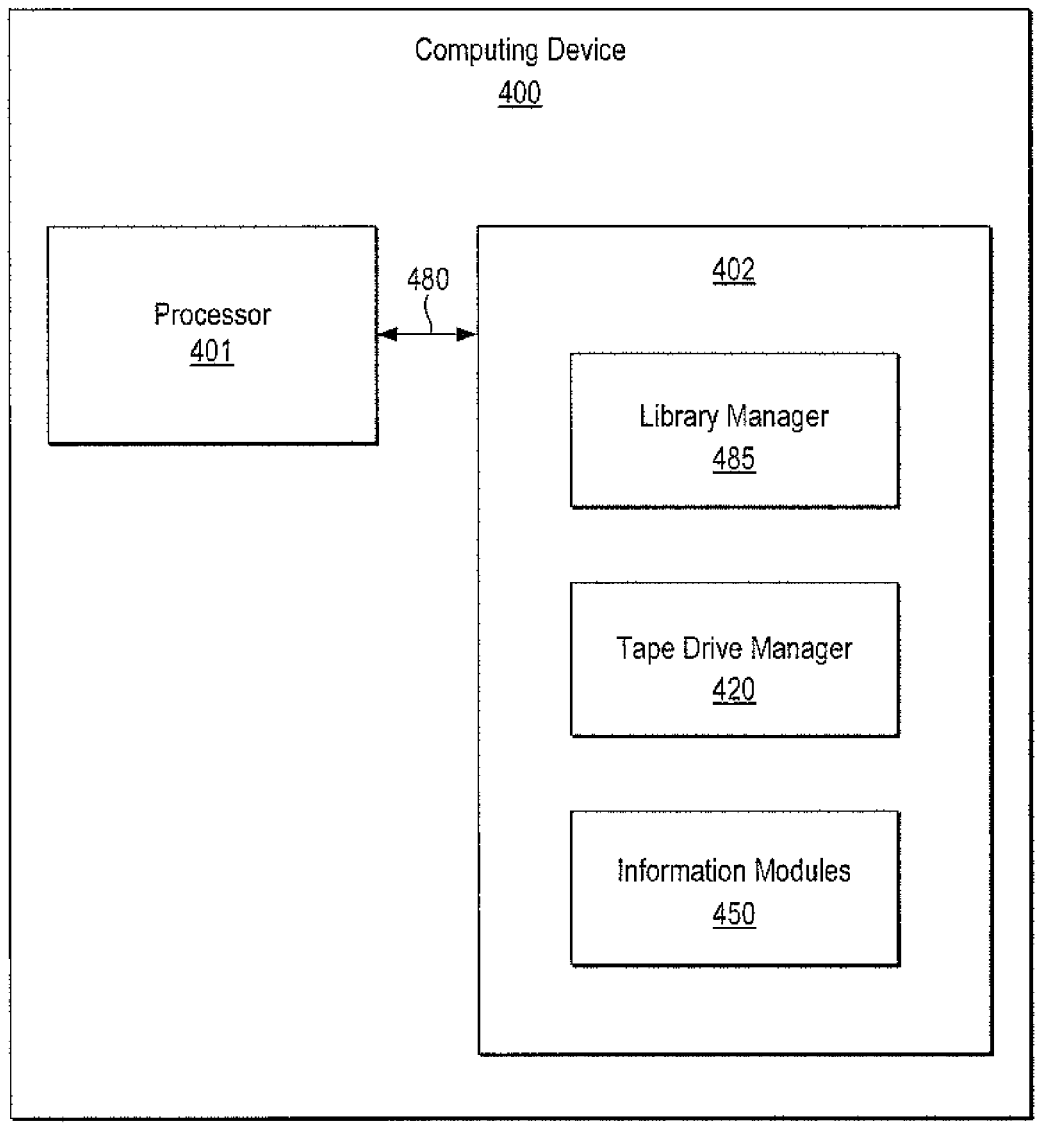
FIG. 4 is a block diagram illustrating a computing device such as a tape library including a processor and a non-transitory, computer-readable storage medium to store instructions to operate the tape library to upgrade firmware with upgrade information from a tape cartridge according to an example.

FIG. 4 is a block diagram illustrating a computing device such as a tape library including a processor and a non-transitory, computer-readable storage medium to store instructions to operate the tape library to upgrade firmware with upgrade information from a tape cartridge according to an example. Referring to FIG. 4, in some examples, the non-transitory, computer-readable storage medium 402 may be included in a computing device 400 such as a tape library. For example, the computing device 400 may include a processor 401, a tape library manager 485, a tape drive manager 420, and information modules 450. In some examples, the tape library manager 485, the tape drive manager 420, and the information modules 450 may correspond to the tape library manager, the tape drive manager, and the information modules previously disclosed with respect to FIGS. 1-3.

The processor 401 generally retrieves and executes the instructions stored in the non-transitory, computer-readable medium 402 to operate the computing device 400 such as a tape library in accordance with an example. In an example, the tangible, machine-readable medium 402 can be accessed by the processor 401 over a communication path 480 such as a bus, wireless channel, and the like. In some examples, the tape library manager 485, tape drive manager 420, and information modules 450 may be implemented, in whole or part, in the computer-readable storage medium 402. That is, the tape library manager 485 may be implemented in a first region of the non-transitory, computer-readable medium 402. The tape drive manager 420 may be implemented in a second region of the non-transitory, computer-readable medium 402. The information modules 450 may be implemented in a third region of the non-transitory, computer-readable medium 402.

Referring to FIG. 4, in some examples, the non-transitory, computer-readable storage medium 402 may correspond to a storage device that stores instructions, such as computer-implemented instructions and/or programming code, and the like. For example, the non-transitory, computer-readable storage medium 402 may include a non-volatile memory, a volatile memory, and/or a storage device. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM).

Referring to FIG. 4, examples of storage devices may include, but are not limited to, hard disk drives, compact disc drives, digital versatile disc drives, optical drives, and flash memory devices. In some examples, the non-transitory, computer-readable storage medium 402 may even be paper or another suitable medium upon which the instructions are printed, as the instructions can be electronically captured, via, for instance, optical scanning of the paper or other medium, then compiled, interpreted or otherwise processed in a single manner, if necessary, and then stored therein. The non-transitory, computer-readable storage medium 402 may be implemented in whole or in part as instructions such as computer-implemented instructions stored in the computing device locally or remotely, for example, in a server or a host computing device considered herein to be part of the tape library.

The present disclosure has been described using non-limiting detailed descriptions of examples thereof that are not intended to limit the scope of the general inventive concept. it should be understood that features and/or operations described with respect to one example may be used with other examples and that not all examples have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples may include structure, acts or details of structures and acts that may not be essential to the general inventive concept and which are described for illustrative purposes. Structure and acts described herein are replaceable by equivalents, which perform the same function, even if the structure or acts are different, as known in the art. Therefore, the scope of the general inventive concept is limited only by the elements and limitations as used in the claims.

What is claimed is:

1. A method of upgrading firmware with upgrade information from a tape cartridge, the method comprising:
receiving a respective tape cartridge of a plurality of tape cartridges by a respective cartridge receiving compartment of a plurality of cartridge receiving compartments of a tape library;
configuring a memory of a tape drive manager to include a plurality of information modules associated with the plurality of tape cartridges, respectively, such that each information module to include an internal tape identifier to identify a corresponding tape cartridge and firmware to cause the tape drive manager to write data to and read data from the corresponding tape cartridge;
in response to a respective cartridge receiving compartment receiving a respective tape cartridge, determining whether an external tape identifier obtained from the respective tape cartridge in a wireless manner corresponds with an internal tape identifier included in one of the plurality of information modules by the tape drive manager; and
when the external tape identifier obtained from the respective tape cartridge corresponds with one of the plurality of information modules, upgrading the corresponding firmware of the one of the plurality of information modules by the tape drive manager using upgrade information obtained from the respective tape cartridge in the wireless manner;
subsequently executing the upgraded firmware to write data to and read data from the respective tape cartridge.

2. The method according to claim 1, further comprising:
transferring the respective tape cartridge to the respective cartridge receiving compartment of a respective tape drive of a plurality of tape drives by a tape library manager to allow the tape drive manager to write data to and read data from the respective tape cartridge.

3. The method according to claim 1, further comprising;
verifying whether the tape drive manager is authorized to at least one of upgrade the respective firmware using the upgrade information obtained from the respective tape cartridge, and to write data to and read data from the respective tape cartridge by an authorization module.

4. The method according to claim 1, wherein the upgrading the respective firmware of a respective information module associated with the respective tape cartridge by the tape drive manager using upgrade information obtained from the respective tape cartridge in the wireless manner based on an affirmative identifier determination further comprises:
identifying differences between the upgrade information and the respective firmware by the tape drive manager; and
transferring the upgrade information to the respective information module associated with the respective firmware by the tape drive manager for the upgraded firmware to include the identified differences.

5. The method according to claim 4, wherein the transferring the upgrade information to the respective information module associated with the respective firmware by the tape drive manager further comprises:
replacing the respective firmware with the upgrade information by the tape drive manager.

6. The method according to claim 4, wherein the transferring the upgrade information to the respective information module associated with the respective firmware by the tape drive manager further comprises:
adding the identified differences between the upgrade information and the respective firmware to the respective firmware by the tape drive manager.

7. The method according to claim 1, wherein:
the determining whether an external tape identifier obtained from the respective tape cartridge in a wireless manner corresponds with an internal tape identifier of one of the plurality of information modules by the tape drive manager further includes reading from a radio frequency identification (RFID) tag disposed on the respective tape cartridge by a wireless transfer device; and wherein:
the upgrading the respective firmware of a respective information module associated with the respective tape cartridge by the tape drive manager using upgrade information obtained from the respective tape cartridge in the wireless manner based on an affirmative identifier determination further includes reading from the RFID tag disposed on the respective tape cartridge by the wireless transfer device.

8. A tape library, comprising:
a plurality of cartridge receiving compartments to receive a plurality of tape cartridges, respectively; and
a tape drive manager including a memory to include a plurality of information modules associated with the plurality of tape cartridges, respectively, such that each information module to include an internal tape identifier to identify a corresponding tape cartridge and a firmware to cause the tape drive manager to write data to and read data from the corresponding tape cartridge, wherein the tape drive manager performs the steps of:
in response to a respective cartridge receiving compartment receiving a respective tape cartridge, determining whether an external tape identifier obtained from the respective tape cartridge in a wireless manner corresponds with an internal tape identifier included in one of the plurality of information modules;
in a case the external tape identifier obtained from the respective tape cartridge corresponds with one of the plurality of information modules, upgrading the corresponding firmware of the one of the plurality of information modules using upgrade information obtained from the respective tape cartridge in the wireless manner; and subsequently executing the upgraded firmware to write data to and read data from the respective tape cartridge.

9. The tape library of claim 8, further comprising:
a plurality of tape drives, each one including a respective cartridge receiving compartment; and
a tape library manager to transfer the respective tape cartridge to the respective cartridge receiving compartment of a respective tape drive to allow the tape drive manager to write data to and read data from the respective tape cartridge.

10. The tape library of claim 8, wherein the tape drive manager further comprising:
an authorization module to verify whether the tape drive manager is authorized to at least one of upgrade the respective firmware using the upgrade information obtained from the respective tape cartridge, and to verify whether the tape drive manager is authorized to write data to and read data from the respective tape cartridge.

11. The tape library of claim 8, wherein the tape drive manager to upgrade the respective firmware of a respective information module associated with the respective tape cartridge further comprises the tape drive manager to:
identify differences between the upgrade information and the respective firmware; and
transfer the upgrade information to the respective information module associated with the respective firmware for the upgraded firmware to include the identified differences.

12. The tape library of claim 11, wherein the tape drive manager to transfer the upgrade information to the respective information module associated with the respective firmware further comprises the tape drive manager to replace the respective firmware with the upgrade information.

13. The tape library of claim 8 wherein:
the tape drive manager to upgrade the respective firmware using upgrade information obtained from the matching tape cartridge in the wireless manner further includes a wireless transfer device to read from a radio frequency identification (RFID) tag disposed on the respective tape cartridge; and wherein:
the tape manager to determine whether an external tape identifier obtained from the respective tape cartridge in a wireless manner corresponds with an internal tape identifier further includes the wireless transfer device to read from the RFID tag disposed on the respective tape cartridge.

14. A non-transitory computer-readable medium having computer executable instructions stored thereon for a tape library to upgrade firmware with upgrade information from a tape cartridge, the instructions are executable by a processor to:
receive a respective tape cartridge by a respective cartridge receiving compartment of a respective tape drive of a tape library including a plurality of tape cartridges, and a plurality of tape drives having a plurality of cartridge receiving compartments therein, respectively;
configure a memory of a tape drive manager to include a plurality of information modules associated with the plurality of tape cartridges, respectively, such that each information module to include an internal tape identifier to identify a corresponding tape cartridge and a firmware to cause the tape drive manager to write data to and read data from the corresponding tape cartridge;
in response to the respective cartridge receiving compartment receiving the respective tape cartridge, determine whether an external tape identifier obtained from the respective tape cartridge in a wireless manner corresponds with an internal tape identifier included in one of the plurality of information modules by the tape drive manager;
in a case the external tape identifier obtained from the respective tape cartridge corresponds with one of the plurality of information modules, upgrade the corresponding firmware of the one of the plurality of information modules by the tape drive manager using upgrade information obtained from the respective tape cartridge in the wireless manner; and
subsequently execute the upgraded firmware to write data to and read data from the respective tape cartridge.

\* \* \* \* \*

UNITED STATES PATENT AND TRADEMARK OFFICE
CERTIFICATE OF CORRECTION

PATENT NO.        : 8,819,664 B2  
APPLICATION NO.   : 13/666607  
DATED             : August 26, 2014  
INVENTOR(S)       : Mike Alan Holmberg et al.

Page 1 of 1

It is certified that error appears in the above-identified patent and that said Letters Patent is hereby corrected as shown below:

In the Claims

In column 7, line 62, in Claim 3, delete "comprising;" and insert -- comprising: --, therefor.

In column 9, line 34, in Claim 13, delete "claim 8" and insert -- claim 8, --, therefor.

Signed and Sealed this  
Third Day of February, 2015

Michelle K. Lee  
*Deputy Director of the United States Patent and Trademark Office*